US009933095B2

(12) United States Patent
Deisinger et al.

(10) Patent No.: US 9,933,095 B2
(45) Date of Patent: Apr. 3, 2018

(54) FASTENER HAVING AN INNER UNDERCUT REGION

(71) Applicant: GKN Driveline International GmbH, Lohmar (DE)

(72) Inventors: Markus Deisinger, Siegburg (DE); Ralf Schumacher, Köln (DE); Joachim Wette, Hennef (DE); Daniela Ballas, Remscheid (DE); Andreas Gehrke, Siegburg (DE); Ludger Wenning, Neunkirchen-Seelscheid (DE); Achim Pfeifer, Siegburg (DE); Maik Lehmann, Seelscheid (DE)

(73) Assignee: GKN Driveline International GmbH, Lohmar (DE)

( * ) Notice: Subject to any disclaimer, the term of this patent is extended or adjusted under 35 U.S.C. 154(b) by 0 days.

(21) Appl. No.: 15/333,527

(22) Filed: Oct. 25, 2016

(65) Prior Publication Data

US 2017/0037990 A1 Feb. 9, 2017

Related U.S. Application Data

(63) Continuation of application No. PCT/EP2015/060038, filed on May 7, 2015.

(30) Foreign Application Priority Data

May 9, 2014 (DE) .................. 10 2014 106 599

(51) Int. Cl.
*F16L 33/02* (2006.01)
*F16B 2/08* (2006.01)

(52) U.S. Cl.
CPC ............ *F16L 33/02* (2013.01); *F16B 2/08* (2013.01); *Y10T 24/148* (2015.01)

(58) Field of Classification Search
CPC ............ Y10T 24/148; F16L 33/02; F16L 2/08
See application file for complete search history.

(56) References Cited

U.S. PATENT DOCUMENTS

| 5,001,816 A | * | 3/1991 | Oetiker | F16B 2/08 24/20 CW |
| 5,150,503 A | * | 9/1992 | Muller | F16B 2/08 24/20 EE |

(Continued)

FOREIGN PATENT DOCUMENTS

| DE | 4009259 A1 | 10/1990 |
| DE | 4021746 A1 | 1/1992 |

(Continued)

OTHER PUBLICATIONS

International Preliminary Report on Patentability for PCT/EP2015/060038 dated Nov. 15, 2016 (8 pages).

(Continued)

*Primary Examiner* — Robert Sandy
*Assistant Examiner* — Michael S Lee
(74) *Attorney, Agent, or Firm* — Bejin Bieneman PLC (57) ABSTRACT

A fastening means, in particular for a bellows, comprises a male end segment and a female end segment complementary to the male end segment. The fastening means can be used to fasten bellows to joint housings and/or shafts. The fastening means has an inner undercut region in order to provide an improved closing behavior of the fastening means.

19 Claims, 6 Drawing Sheets

(56) References Cited

U.S. PATENT DOCUMENTS

| | | | |
|---|---|---|---|
| 5,185,908 A | 2/1993 | Oetiker | |
| 5,768,752 A | 6/1998 | Oetiker | |
| 6,421,886 B1 | 7/2002 | Oetiker | |
| 6,511,380 B1* | 1/2003 | Oetiker | F16B 2/08 277/636 |
| 2012/0061076 A1 | 3/2012 | McDaniel et al. | |
| 2017/0108021 A1* | 4/2017 | Deisinger | F16B 2/08 |

FOREIGN PATENT DOCUMENTS

| | | |
|---|---|---|
| DE | 4009259 C2 | 3/2001 |
| DE | 10032331 C1 | 9/2001 |
| DE | 69708164 T2 | 8/2002 |
| EP | 0802333 A1 | 10/1997 |
| EP | 1930644 A1 | 6/2008 |
| WO | 9939123 A1 | 8/1999 |

OTHER PUBLICATIONS

International Search Report and Written Opinion for PCT/EP2015/060038 dated Aug. 11, 2015 (with English translation; 14 pages).
International Search Report and Written Opinion for PCT/EP2015/060034 dated Aug. 4, 2015 (w English translation; 14 pages).
Non-Final Office Action dated Oct. 31, 2017 for U.S. Appl. No. 15/333,532 (20 pages).

\* cited by examiner

FASTENER HAVING AN INNER UNDERCUT REGION

CROSS-REFERENCE TO RELATED APPLICATIONS

This application claims priority to, and is a continuation of, Patent Cooperation Treaty Application No. PCT/EP2015/060038, filed on May 7, 2015, which claims priority to German Application No. DE 10 2014 106 599.9 filed on May 9, 2014, each of which applications are hereby incorporated herein by reference in their entireties.

BACKGROUND

Means for fastening bellows produced from elastomer materials, in particular pleated bellows and roller bellows, are well known. Thus, for some time, so-called mutually overlapping retaining straps have been available that attain a clamping effect by tautening the two free strap ends with suitable means. However, the pleated bellows can be damaged in the region of the free strap ends, and the latter also require considerable space for installation. A number of so-called endless annularly closed clamping rings have therefore been suggested in the past. Their diameter is reduced by crimping, i.e., by radial compression by means of suitable tools, so that during the crimping process a bellows is ultimately securely held on a fastening body, for instance, a joint housing or a shaft.

To produce such endless annularly closed clamping rings, it is known to roll tape pieces trimmed from an endless tape material and butt-weld them to one another perpendicular to the center line of the ring, but this technique is very time-consuming. In contrast, instead of such welding, known from DE 40 21 746 A1 is providing on the first and second free ends of a tape segment outside and inside closure strips that are embodied complementary to one another and have undercut regions so that, when the closed connection is under tensile load, inwardly directed forces that permit a point connection of the two complementary closure strips act on the outer closure straps. An end region may be embodied, for instance, such that an essentially T-shaped head piece is embodied thereon, while the second end region complementary hereto provides a jaw-shaped fork adapted to the first end region, the two end regions linearly butting and engaging one another. A plurality of dovetail or T-shaped strips may also be provided on the ring width. Such endless annularly closed tensioning rings described in DE 40 21 746 A1 have become known as such with a so-called puzzle lock. However, it is a disadvantage of the endless tensioning ring known from DE 40 21 746 A1 that these can open occasionally, whether during transport to the consumer or user of the closed endless tensioning rings, or whether during use of the latter, for instance for retaining pleated bellows or roller bellows on outer joint housing parts or shafts. There is therefore a need for fastening means that have improved closure of the two free ends of a strip-like segment for forming an endless tensioning ring.

SUMMARY

Disclosed herein is a fastening means, in particular for bellows, comprising a male end segment and a female end segment complementary to the male end segment, as well as the use thereof for fastening bellows on joint housings and/or shafts, which fastening means has an improved closing behavior. An inner undercut region is embodied in the male end segment.

A fastening means of the aforesaid type features the female end segment including a base on which there is arranged approximately centrally a foot segment arranged, on which is arranged a head part that projects laterally over an outer contour of the foot segment and, further comprising lower lateral surfaces, as seen transverse to a length direction of the fastening means, for fitting into at least one inner undercut region in a recess of the male end segment.

The fastening means is improved both with respect to static load and also dynamic load compared to those from the prior art. The reason for this is the provision of the foot segment with the head part, which is arranged approximately in the center in the female end segment and which can be engaged in the male end segment embodied complementary thereto. A corresponding recess is provided there through which an inner undercut region is embodied in the male end segment. In addition to the inner undercut region, the male end segment has at least one (first) outer or transverse undercut region. A female end segment in the context of the present disclosure describes such an undercut region, which receives a male end segment and is primarily lateral.

When the present disclosure addresses an inner undercut region, this means an undercut region that is formed exclusively using the examples of the male and female end segments, and has neither a direct transverse, nor a direct longitudinal, undercut with respect to an outer wall of the fastening means. In this context, transverse means that undercuts are embodied transverse to a length direction of the fastening means, the term "transverse" here encompassing not only transverse undercuts that run at a right angle to the outer wall of the fastening means, but also those that run at an angle with respect to the outer wall of the fastening means. In this context, longitudinal means that undercuts run in the length direction of the fastening means, "length direction" meaning that they may run both approximately parallel to the outer wall of the fastening means and at an angle thereto. The inner undercut region also has transverse undercuts, but these are formed in recesses of the female and/or male end segment and therefore do not relate to the outer wall of the fastening means.

For an interiorly disposed undercut region, it is always necessary for at least one recess to be provided in a center element, arranged in the male or female end segment, in which a complementary center element of the female or male end segment may engage. In the context of the present disclosure, more than one inner undercut region, for instance two or three undercut regions, may also be provided.

The male segment may be considered as provided with a tongue-like projection, arranged approximately centrally on a base of the male end segment. The latter has at least one foot part and at least one head part, wherein the head part, in the case of the male end segment, has first and second extensions that project beyond an outer contour of the particular foot part. The disclosed example of the female end segment with an inner undercut region may be also be considered mushroom-shaped or the like with respect to the foot segment with head part, or may also be considered tongue-like. However, the extension of this tongue or this mushroom head in the length direction of the fastening means is at most approximately 50% of that of the tongue-like projection of the male end segment, preferably between approximately 15% and approximately 42%. The foot segment with head part, arranged approximately centrally in the female end segment, may be considered to be a projection, especially a mushroom head-shaped projection, arranged on the base of the female end segment. This projection can be arranged on the base with longitudinal segments of the female end segment adjacent on both sides. The projection may project over the longitudinal segments in the length direction of the fastening means or may be arranged within one of these defined spaces. The mushroom head-shaped projection of the female end segment is preferably arranged or arrangable inside the male end segment in a recess of the latter when the fastening means is in the closed condition. Apart from any overcuts provided in edge areas for better connection when closed, an outer contour of the mushroom head-shaped projection of the female end segment essentially corresponds to an inner contour of the male end segment. A recess in the male end segment is arranged in a center element for forming an inner undercut region, e.g., in a head part arranged there. The means for forming an inner undercut region on the male end segment can have a foot part that carries the head part with the recess. The head part can project beyond the foot part, forming two extension parts. The recess can be provided between them.

Undercut regions, of which there may be one, two, three, four, or more, shall be understood in the context of the present disclosure to be those regions that, with respect to the male end segment, are those undercuts that are transverse or longitudinally direct relative to the outer wall of the fastening means.

In the present disclosure, when an inner undercut region and at least one first outer (transverse) undercut region are mentioned, undercut regions that have transverse undercuts are meant. The transverse undercuts are formed from linear and curved segments, frequently having different radii. The inner undercut region and the at least one outer undercut region extend in the length direction of the fastening means, preferably between minimum widths, relative to the specific undercut regions, of the center elements associated with one another in the male and female end segments. For instance, the inner undercut region extends proceeding from a minimum width $b_3$ of the foot segment of the female end segment to the minimum widths $b_{61}$ and $b_{62}$ of the two extension parts of the head part of the male end segment. For instance, a first outer, transverse undercut region of the male end segment extends approximately between region of minimum width $b_1$ of a first foot segment that is arranged on a base of the male end segment to approximately a minimum width $b_{21}$ and $b_{22}$ of two longitudinal segments of the complementary female end segment, arranged on both sides of the foot segment of the female end segment that is arranged centrally on the base and that there has, for instance, a first outer, transverse undercut region. In this example there is exactly one first outer undercut region. In the context of the present application, a first transverse undercut region relative to the male and female segments shall be construed to mean the transverse undercut region next to the base of the male segment, wherein in the case of the female end segment this refers to the fastening means being in the closed condition. Alternatively, with respect to the female segment when the fastening means is in the open condition, the first transverse undercut region may be defined as the undercut region next to an end of the female end segment. The end of the female end segment is associated with the base of the male end segment in the closed condition or is immediately adjacent thereto. If only one transverse (outer) undercut region is provided in the male and female end segments, therefore just a first undercut region for each, these are associated with one another when the fastening means is in the closed condition.

In contrast, if more than one transverse male and female undercut regions are provided, they are not associated with one another. For instance, in this case the first male transverse (outer) undercut region is associated with the second female transverse (outer) undercut region. There are the same number of male and female transverse (outer) undercut regions. The fastening means can have precisely one inner undercut region and one outer transverse undercut region. These can be embodied by the means for forming an inner undercut region.

The fastening means can be embodied in a ribbon-like form. It is produced in this shape and then bent to create a closed ring. In one example, therefore, the claimed fastening means may be closed to create a closed ring, and especially may be embodied as a closed ring, the complementary male and female end segments being connected to one another. It may be advantageously provided that the male or female end segment may have material overcuts, especially in their respective head parts, but also in the foot part, wherein overcuts means material overcuts, so that when the ribbon-like fastening means is closed to create a closed ring, deformations due to material overlays occur in these regions. Due to this, in regions that are very highly stressed when the fastening means is in use and in which cracks may be formed, crack formation may be prevented so that the service life of the fastening means embodied as a closed ring is extended in the fastening condition.

By bending the strip-like fastening means to create a closed ring and also by crimping for fastening, for instance, a bellows with the fastening means, forge deformations and/or other deformations of the male and female end segments occur. Therefore, in the present disclosure, when reference is made to geometric values or ranges, such as for instance angles or radii, or to value-related terms such as parallel and the like, these references relate to the ribbon-like fastening means, that is, not to the closed fastening means. In contrast, the minimum widths are generally approximately retained in a closed and crimped fastening means.

In the present disclosure, when the term "approximately" is used in reference to concrete values, value-related terms like parallel, etc. or ranges of values, these shall be construed to include such deviations as the person skilled in the art considers to be normal, especially deviations of +/−10% of the specific value or term, preferably +/−5% of the specific value or value-related term.

In a finite element analysis, it was shown that, due to the example of an inner undercut region in a recess arranged in a center element of the male end segment, the fastening means has excellent values not only for static tensile elongation, but also for dynamic tensile-bending strain. In addition, finite element methods demonstrated that the fastening means yield very good values for a static crack opening, determined in an intermediate stress step during the assembly of the binder. For all of the aforesaid variables that are determined normalized using finite element methods, values less than 100%, and preferably less than 80%, could be determined. This means that only extremely small crack openings will occur in use or during post-production delivery of the closed, ring-shaped fastening means, in general also a system having a bellows. The values for dynamic tensile-bending strain are in particular a maximum of approximately 80%, possibly a maximum of approximately 75%, possibly in a range from approximately 20% to approximately 80%, and thus are values that are clearly below those values for puzzle connections according to the prior art, likewise determined by finite element methods and normalized, the values of which are often significantly greater than 100%.

In one example, the foot segment of the female end segment is embodied proceeding from the base thereof tapering to a minimum width $b_3$. Furthermore a transition angle β between base and foot segment can be in a range from approximately 91° to approximately 110°, possibly in a range from approximately 93° to approximately 108°. Furthermore, arranged between lateral surfaces of the foot segment and the lower lateral surfaces of the head part of the female end segment, there can be radial regions having notch radii of at least approximately 0.3 mm, possibly notch radii of at least approximately 0.5 mm, and possibly notch radii in a range from approximately 0.3 mm to approximately 0.9 mm. It is possible that different notch radii are provided in the aforesaid radial ranges. Possible in the range of minimum widths, such as for instance the minimum width of the foot segment of the female end segment, are radii of approximately 0.7 mm to approximately 0.9 mm, possibly approximately 0.8 mm to approximately 0.9 mm, to which then a minimum radius in a range from approximately 0.3 mm to approximately 0.4 mm can connect. The aforesaid minimum radii, which are possibly in a range from approximately 0.25 mm to approximately 0.5 mm, possibly in a range from approximately 0.3 mm to approximately 0.4 mm, serve to make available the most possible functions such as undercuts or load-bearing cross-sectional surfaces of the fastening means on the available narrow space. A normal width b of an fastening means is in a range from approximately 8 mm to approximately 20 mm, possibly approximately 9 mm to approximately 13 mm. However, these minimum radii are not used in the region of the minimum widths, because otherwise strong notch effects would occur there. Only when there is at least a 0.1 mm enlargement of the cross-section due to a larger radius, in particular a radius in a range from approximately 0.7 mm to approximately 0.9 mm, should a minimum radius be provided connecting thereto. In the region of a critical cross-section, that is, a minimum cross-section or width of the male or female end segment, for instance a minimum width of the foot segment, possibly the largest possible notch radii are used in a range from approximately 0.4 mm to approximately 1 mm, possibly to approximately 0.9 mm. According to the present disclosure, the transition from a minimum radius to a larger radius or vice versa is always tangentially continuous. The aforesaid local radii of curvature are advantageously determined by comparing different known conforming radii.

At least parts of, possibly all of, the lateral surfaces of the head part of the female end segment are advantageously embodied curved with notch radii of at least approximately 0.3 mm, possibly of at least approximately 0.5 mm, possibly with notch radii in a range from approximately 0.3 mm to approximately 0.9 mm. In this case, as well, different radii may connect to one another, as described in the foregoing. One lateral head surface of the head part is embodied in at least one sub-region approximately parallel to the base of the female end segment. It is possible that the radial regions of the lateral surfaces of the head part transition, with notch radii of at least approximately 0.5 mm, possibly at least approximately 0.7 mm, possibly in a range of approximately 0.7 mm to approximately 0.9 mm, into the lateral head surface of the head part. A linear region without any curvature may be provided following the radial region.

In one example, an outer longitudinal segment whose outer wall transitions flush into the outer wall of the fastening means is arranged on both sides of the foot segment of the female end segment. In their ends that are associated with the male end segment, the longitudinal segments may have recesses in which lengthening segments of the male end segment may be arranged. This provides additional longitudinal undercuts that further prevent the risk of a connection between male and female end segments in a closed fastening means from being opened if there is a bending stress.

In a first example, the two outer longitudinal segments project beyond the head part of the female end segment in a length direction of the fastening means. In a second example, as seen in a length direction of the fastening means, the head part of the female end segment projects beyond the outer longitudinal segments, or projects out beyond the ends of the outer longitudinal segments. In the second example, therefore, the male end segment has a recess embodied beyond the base thereof as seen in the length direction of the strip, in which recess the foot part engages with the head part of the complementary female end segment.

In one example of the fastening means, in addition to the at least one inner undercut region, the male end segment includes at least one outer undercut region. It may also be provided that at least two or three or more undercut regions, but possibly a first outer undercut region or a first and a second outer undercut region or a first, second, and third outer undercut region is provided. The female undercut regions are complementary to the outer undercut regions of the male end segments so that the female end segment includes a first (female) undercut region or a first and a second (female) undercut region or a first, second, and third (female) undercut region. It is possible that the fastening means has an inner undercut region and a first undercut region or a first and a second undercut region. The male end segment advantageously has a foot segment that is embodied proceeding from a base tapering to a minimum width $b_1$.

A transition angle γ (gamma) between the base and the foot segment of the male end segment is advantageously in a range from approximately 90.5° to approximately 110°, more preferably in a range from approximately 93° to approximately 106°.

In another example, arranged at the end of the foot segment of the male end segment that faces away from the base is a head part of extension parts that embody the inner undercut region, in particular in that they form a recess for foot part with head part of the female end segment.

The extension parts comprise lateral transverse surfaces for embodying the at least one outer undercut region. The lateral transverse surfaces, with lateral longitudinal surfaces of the foot segment of the male end segment, form an acute angle W in a range from approximately 45° to approximately 88°, possibly in a range from approximately 68° to approximately 88°, possibly in a range from approximately 75° to approximately 86°. Further possible is that the acute angle W is 80°+5°, which means that an acute angle W of 80° is possible, but it may have a production tolerance of +5°.

Advantageously arranged in the region between the lateral longitudinal surfaces of the foot segment and lateral transverse surfaces of the extension parts of the male end segment are notch radii of at least approximately 0.3 mm, possibly at least approximately 0.5 mm, and possibly especially in a range from approximately 0.3 mm to approximately 0.9 mm. It may also be advantageously provided here that different radii are used, wherein in the region of the minimum width $b_1$ of the foot segment of the male end segment greater notch radii in a range from approximately 0.7 mm to approximately 0.9 mm are advantageously provided, to which are connected minimum radii in a range from approximately 0.25 mm to approximately 0.5 mm, possibly in a range from approximately 0.3 mm to approximately 0.4 mm.

Lateral surfaces of the extension parts are advantageously embodied approximately parallel to the outer wall of the fastening means. However, it may also be provided that the lateral surfaces are embodied slightly angled to the outer wall of the fastening means, i.e. especially advantageously the head part of the male end segment as seen in the long direction of the fastening means is embodied tapering somewhat. The deviations from a parallel orientation are preferably in a range from approximately +/−10°, possibly in a range from approximately +/−5°. The lateral surfaces of the extension parts may be embodied not only linearly, but also in another manner, in particular they may have bent regions that form bulges or indentations in the extension parts of the head part of the male end segment. The transition between the lateral surfaces of the extension parts of the head part of the male end segment and the particular lateral head surfaces thereof, which may be associated with the base of the female end segment, can be at a right angle. For technical production reasons, however, minimum notch radii may be up to 0.3 mm. This cannot be avoided for technical production reasons.

Furthermore possible, embodied between the extension parts is a recess that is complementary to the foot segment with head part arranged on the base of the female end segment. The recess may be described as approximately mushroom head-shaped. Because of this, the center elements that are arranged in the male end segment and that comprise the foot part and the head part with the two extension parts and the recess, are shaped something like a stag beetle. When more than one inner undercut region is provided, tree-like contours may then be added, for instance.

In another example, a length 1 of the foot segment and of the head part with the extension parts of the male end segment is shorter than a width b of the fastening means. The length 1 can be approximately 70% to approximately 98%, possibly approximately 78% to approximately 95%, of the width b of the fastening means.

In one example, minimum widths $b_{21}$ and $b_{22}$ of both outer longitudinal segments and the minimum width $b_3$ of the foot segment of the female end segment are selected such that they are at a ratio $b_1:(b_{21}+b_{22}+b_3)$ or $(b_{11}+b_{12}):(b_{21}+b_{22}+b_3)$ of approximately 0.79 to approximately 1.27, possibly approximately 0.85 to approximately 1.18, possibly approximately 0.95 to approximately 1.05, to the minimum width $b_1$ of the foot segment of the male end segment, or if there is a recess that is arranged displaced beyond the base in a length direction of the fastening means, to the minimum widths $b_{11}$ and $b_{12}$ of longitudinal segments in the region of the recess. This ratio has proved essential in calculating by means of finite element analysis to supply the best values for tensile stresses that occur. In principle the ratios of the minimum widths (cross-section width ratios) of the male and female end segments are systematically formed on a first male and a first female stage, or on a second male and a second female stage, or on a third male and a third female stage, etc., relative to the first or first and second or first and second and third outer undercut regions. The cross-section width ratios of all stages are in the aforesaid preferred regions.

The present disclosure further relates to the use of the fastening means for fastening bellows on joint housings, in particular on outer joint housing parts and/or shafts, especially of automobiles, especially of constant velocity joints. From bellows and fastening means a system is formed that makes it possible to fasten bellows. In particular, this system has a pleated bellows and/or a roller bellows.

SUMMARY OF THE DRAWINGS

The foregoing and other advantages of the present disclosure are explained in greater detail using the following figures.

DETAILED DESCRIPTION

It should first be noted that the examples of the fastening means depicted in the figures should not be interpreted as limiting; for instance, two or more foot segments with head part and extension parts may also be arranged at the base of the female and male end segments in the case of the male end segment. The features described in the figures may be combined to create another example with the features provided in the description above. Moreover, it should be noted that the reference numbers indicated in the description of the figures do not limit the scope of protection for the present disclosure, but instead merely refer to the examples illustrated in the figures. Provided no information to the contrary is explicitly provided, identical parts or part with the same function have the same reference numbers in the following.

Figure 1:
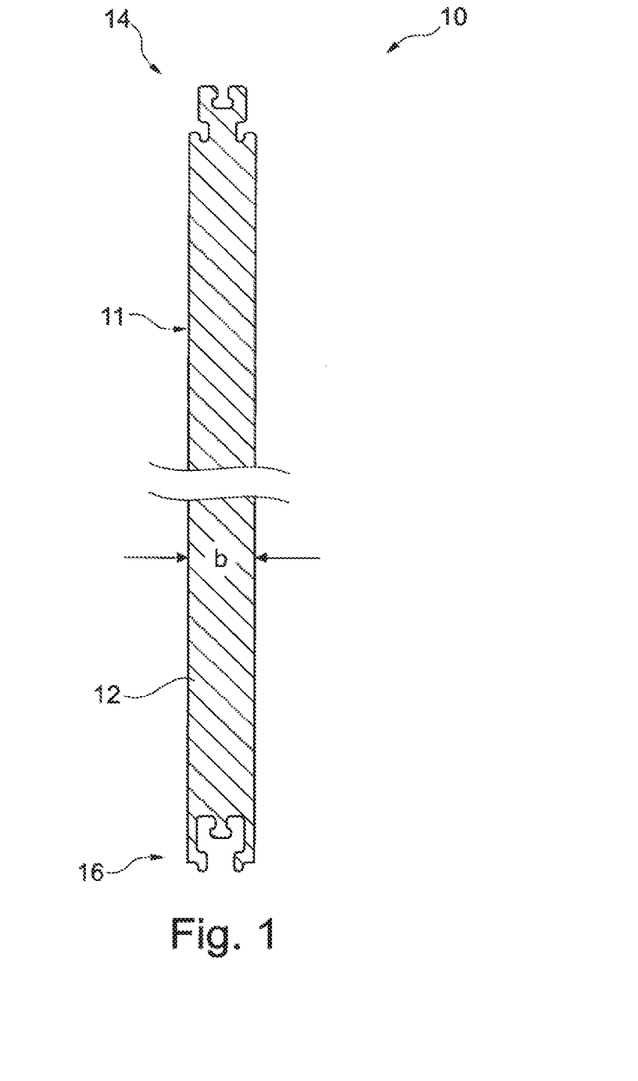
FIG. 1 is a top view of a ribbon-like fastening means in a first example.

FIG. 1 is a top view of a first example of the fastening means 10, which is shown in a ribbon-like shape, i.e., in the non-closed condition. The fastening means 10 has a male end segment 14 and a female end segment 12 between which a strip segment 12 is arranged. The fastening means 10 has an outer wall 11 on both sides.

Figure 2A:
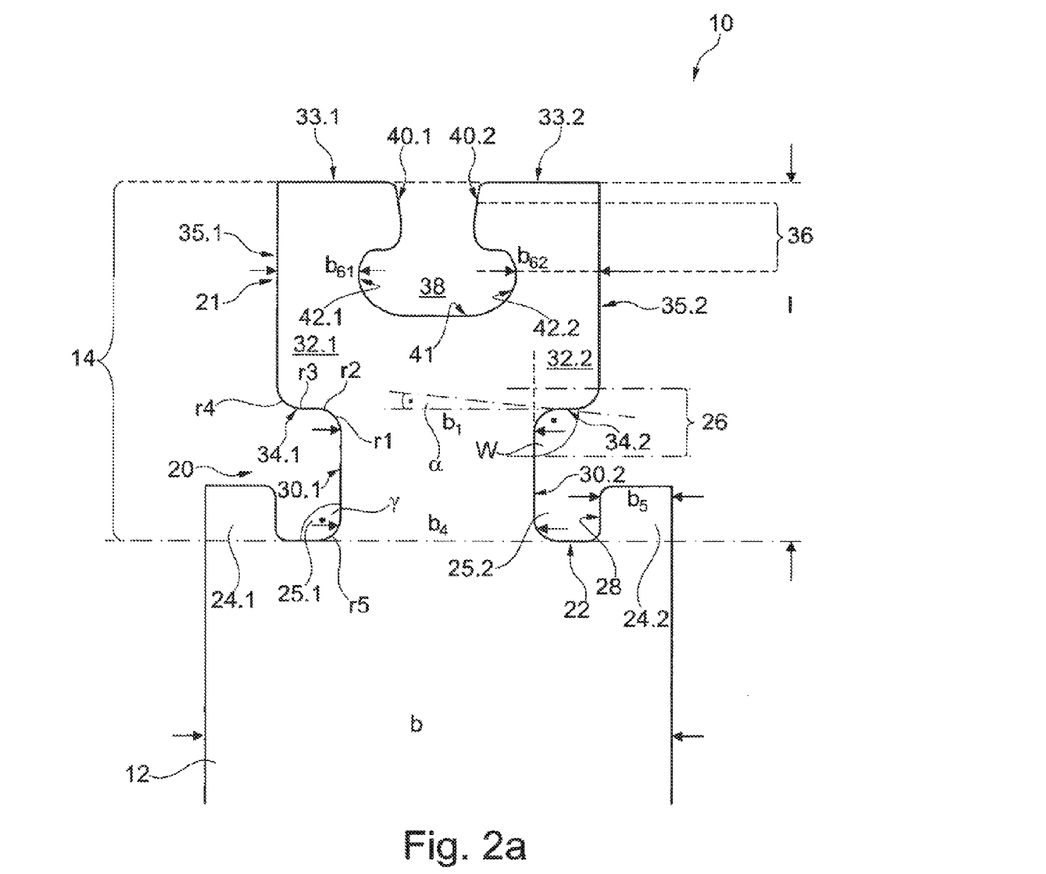
FIG. 2A is a male end segment of the fastening means according to FIG. 1.

FIG. 2A depicts a first example of the male end segment 14 of the fastening means 10 according to FIG. 1. A width b, determined between the outer walls 11, of the fastening means 10 or strip segment 12, is greater than a length 1 of the male end segment, measured between a base 22 and lateral head surfaces 33.1 and 33.2. The length 1 is approximately 80% of the width b.

The male end segment 14 has a foot segment 20 and a head part 21. The head part 21 has two extension parts 32.1 and 32.2 that project laterally beyond an outer contour of the foot part 20. The foot part 20 has lateral longitudinal surfaces 30.1, 30.2, an obtuse angle γ (gamma), approximately 93°, being formed between the base 22 and the lateral longitudinal surfaces 30.1 and 30.2. A notch radius $r_5$ of approximately 0.3 mm is provided in the region of the transition from the base 22 to the lateral longitudinal surfaces 30.1 and 30.2. The foot part 20 is embodied tapering to a minimum width $b_1$. Provided following this minimum width $b_1$ is a first notch radius $r_1$, having a value of 0.8 mm, which transitions continuously tangentially into a notch radius $r_2$ of 0.3 mm. These notch radii $r_1$ and $r_2$ represent the transition from the lateral longitudinal surfaces 30.1 and 30.2 of the foot segment 20 to lateral transverse surfaces 34.1 and 34.2 of the extension parts 32.1 and 32.2, which lateral transverse surfaces 34.1 and 34.2 are arranged in a first and only outer undercut region 26. These then transition into lateral surfaces 35.1 and 35.2 of the extension parts 32.1 and 32.2 with a minimum notch radius $r_3$ of 0.3 mm and connecting thereto continuously tangentially with a notch radius $r_4$ of 0.8 mm. The lateral surfaces 35.1 and 35.2 are not embodied running parallel to the outer wall 11 of the fastening means 10, but instead at an angle of approximately 3° thereto, so that the extension parts 32.1 and 32.2 are embodied somewhat tapering toward the lateral head surfaces 33.1 and 33.2 thereof that can be associated with the female end segment 16. This provides a region, following the notch radius $r_4$, having a minimum width $b_2$ in the complementary female segment 16, as may be seen below in FIG. 2b. In the male end segment 14, the foot segment 20 has a greater width $b_4$ on the base 22 than in the region of the minimum width $b_1$.

The transition between the lateral longitudinal surfaces 35.1 and 35.2 of the extension parts 32.1 and 32.2 into the lateral head surfaces 33.1 and 33.2 runs essentially at a right angle.

Due to production tolerances, however, notch radii may be up to 0.3 mm.

The lateral transverse surfaces 34.1 and 34.2 of the extension parts 32.1 and 32.2 are embodied at an acute angle W of 85° with the lateral longitudinal surfaces 30.1 and 30.2 of the foot segment 20.

The head part 21 of the male end segment 16 has a mushroom head-shaped recess 38 that is for forming an inner undercut region 36 and that is embodied proceeding from the lateral head surfaces 33.1 and 33.2 of the extension parts 32.1 and 32.2. The lateral head surfaces 33.1 and 33.2 transition to inner lateral longitudinal surfaces 40.1 and 40.2 for forming a sort of mushroom stem for the mushroom head-shaped recess 38. The mushroom head of the mushroom head-shaped recess 38 has a lateral base surface 41, some of which is linear and parallel to the base 22 and transitions into curved inner lateral surfaces 42.1 and 42.2 without any linear segments so that ultimately a mushroom head is formed. Minimum widths $b_{61}$ and $b_{62}$ of the extension parts 32.1 and 32.2 may be found in the region of the mushroom head-shaped recess 38.

Figure 2B:
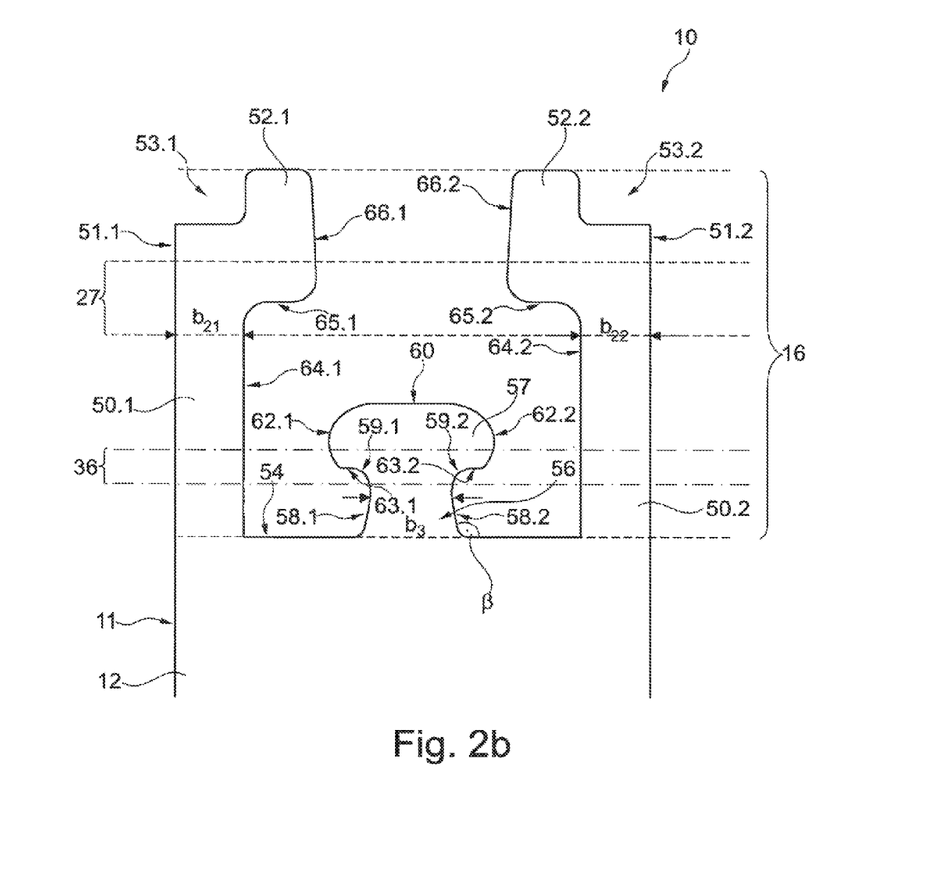
FIG. 2B is a female end segment of the fastening means according to FIG. 1.

FIG. 2B depicts the female end segment 16 of the fastening means 10, in which are shown the only outer undercut region 27, also cited with respect to the complementary example to the male end segment 14, and the inner undercut region 36. The outer undercut regions 26 and 27 extend from the minimum width $b_1$ of the foot segment 20 of the male end segment 14 to the minimum width $b_{21}$ or $b_{22}$ of longitudinal segments 50.1 and 50.2 of the female end segment 16. The inner undercut region 36 extends from a minimum width $b_3$ of a foot segment 56 of the female end segment 16 to the minimum width $b_{61}$ and $b_{62}$ of the extension parts 32.1 and 32.2 of the male end segment 14. Proceeding from a base 54 of the end segment 16, a foot segment 56 with a head segment 57 is arranged approximately in the center. The foot segment 56 has a minimum width $b_3$.

Lateral longitudinal surfaces 58.1 and 58.2 of the length segment 56 transition from an obtuse angle β of approximately 95° into the base 54. The foot segment 56 is thus embodied tapering towards the head part 57. Connecting to the lateral longitudinal surfaces 58.1 and 58.2 of the length segment are lower lateral transverse surfaces 63.1 and 63.2 that are embodied at least in part parallel to the base 54 and transition to curved lateral surfaces 62.1 and 62.2, which themselves transition to a lateral head surface 60 that is embodied with a center sub-region approximately parallel to the base 54. In the transition between the lateral longitudinal surfaces 58.1 and 58.2 of the foot segment 56 and the lower lateral transverse surfaces 63.1 and 63.2, radial regions 59.1 and 59.2 immediately following the minimum width $b_3$ have a notch radius of 0.8 mm and then tangentially continuously a notch radius of 0.3 mm.

Length segments 50.1 and 50.2, whose outer walls 51.1 and 51.2 transition flush into the outer wall 11 of the fastening means 10, are embodied on both sides of the mushroom head-shaped center formed by the foot segment 56 and the head part 57. At its end that may be associated with the male end segment, the length segments 50.1 and 50.2 have recesses 53.1 and 53.2 in which extension segments 24.1 and 24.2 (see FIG. 2A) of the male end segment 14 may engage. This provides a longitudinal undercut 28 (see FIG. 2A). Projections 52.1 and 52.2 of the length segments 50.1 and 50.2, associated with the male end segment 14, come to be positioned therein in recesses 25.1 and 25.2 (see FIG. 2a).

The length segments 50.1 and 50.2 have minimum widths $b_{21}$ and $b_{22}$. These minimum widths $b_{21}$ and $b_{22}$ follow second inner lateral transverse surfaces 65.1 and 65.2 within the outer undercut region 27 and are in the transition to the second inner lateral longitudinal surfaces 64.1 and 64.2, wherein immediately connected to the minimum widths $b_{21}$ and $b_{22}$ is a notch radius of 0.8 mm and provided connected therein is a notch radius of 0.3 mm. The second inner lateral transverse surfaces 65.1 and 65.2 then transition into the first inner lateral transverse surfaces 66.1 and 66.2.

The ratio of the widths $b_1:(b_{21}+b_{22}+b_3)$ is approximately 0.87. With such a ratio, the minimum cross-sectional width of the male end segment 14 and the minimum cross-sectional widths of the female end segment 16 optimize the values for tensile stresses in the fastening means once it has been closed to create a ring.

The outer undercut region 26 of the male end segment 14 comprises the lateral transverse surfaces 34.1 and 34.2 with connecting radial regions as seen above and below in the length direction of the fastening means 10. According to FIG. 2B, the inner undercut region 36 is formed by the lower lateral transverse surfaces 63.1 and 63.2 and the radial regions connected thereto.

Figure 3:
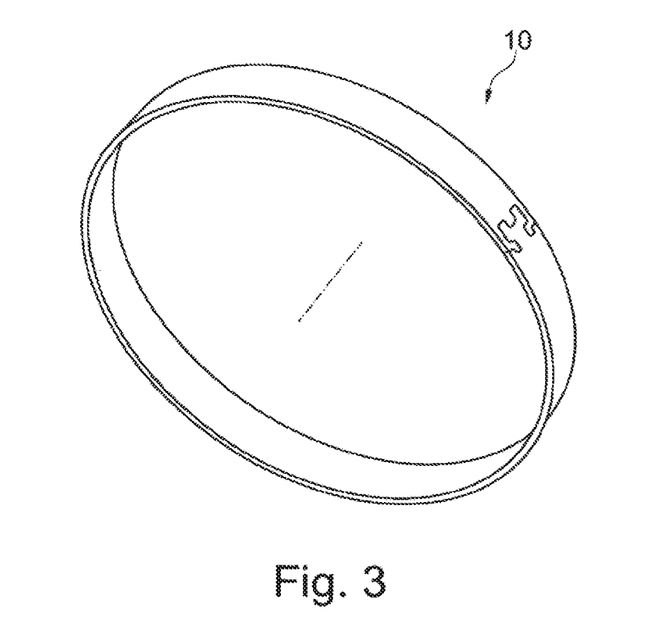
FIG. 3 is a perspective elevation of the fastening means according to FIGS. 1 through 3 in the closed ring condition.
Figure 4:
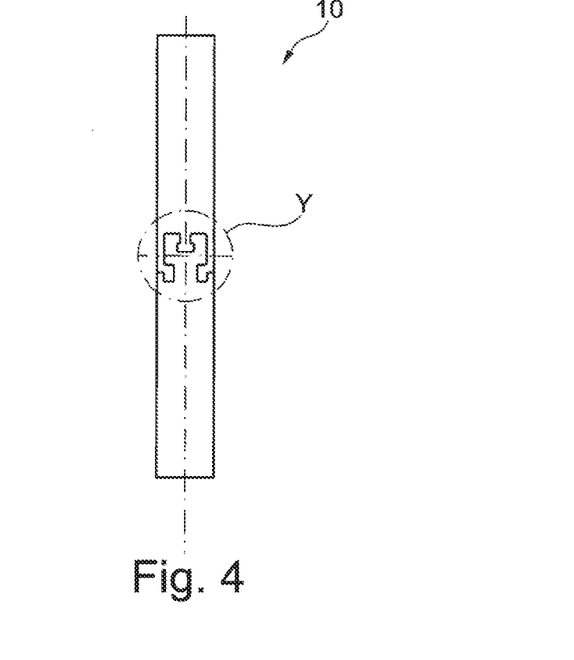
FIG. 4 is a top view of a second example of a closed ring-shaped fastening means.
Figure 6:
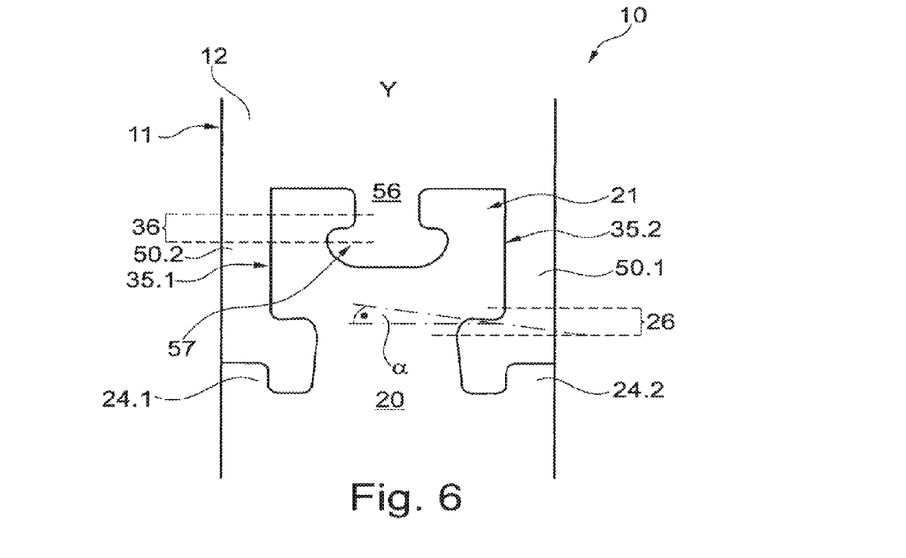
FIG. 6 is a detail Y from the second example according to FIG. 4.

FIG. 3 is a perspective elevation of the first example of the fastening means 10, shaped as a closed ring. In contrast, FIG. 4 is a top view onto a closed ring in a second example of the fastening means 10, the detail Y being shown in FIG. 6. This second example is essentially embodied similar to the first example according to FIGS. 1 through 3, but the lateral longitudinal surfaces 35.1 and 35.2 of the extension parts 32.1 and 32.2 of the head part 21 are oriented exactly parallel to an outer wall 11 of the fastening means 10. In addition, an angle α, which is determined by the lateral transverse surfaces 34.1 and 34.2 and their linear segments on the one hand and, on the other hand, by a straight line running through the base 22 of the male end segment 14 or a parallel thereto, is 10° and not 5°, as in the example according to FIG. 2a. Consequently, in this example the value for the acute angle W, which is not shown in FIG. 6, is approximately 80°, since the angle γ, which is also not shown in FIG. 6, is 93°, just as in the first example according to FIG. 2a. However, the acute angle W may also be, for instance, 70° in an alternative to the example according to FIG. 6. FIG. 6 provides an idealized view of the union of the male end segment 14 and the female end segment 16 on the fastening means 10 that has been closed to create a ring. In fact, due to the use of bending tools there may be minor material deformations, however, so that the precise geometrical values, that is, the precise shape of the male and female end segments 14, 16 in the closed ring, deviate somewhat from those of the open ribbon segment as shown in FIGS. 1 and 2a/b.

Figure 5:
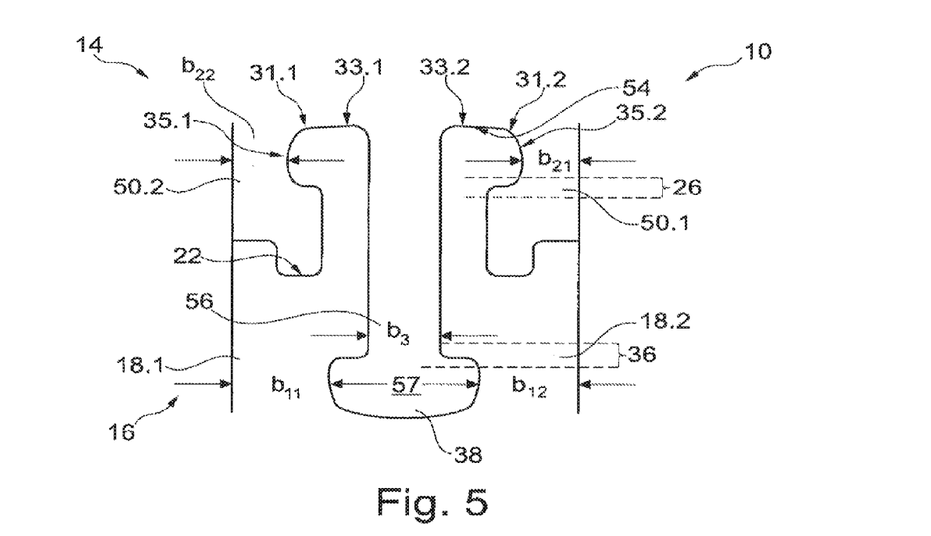
FIG. 5 is a third example of the fastening means.

FIG. 5 depicts a third example of the fastening means 10 when closed, i.e. with male and female end segments, this third example differing from the first and second examples largely in that the foot segment 56 of the female end segment 16 has been lengthened significantly, specifically beyond the base 22 of the male end segment 14 in the length direction of the fastening means 10. Because of this, the head part 57 is disposed on the far side of the base 22 so that then, ultimately, embodied in the male end segment 14 is a recess 38 that is displaced beyond the base 22 in the length direction of the fastening means. In the example according to FIG. 5, the minimum width $b_1$ is formed by the two sub-widths $b_{11}$ and $b_{12}$, so that there is a ratio $(b_{11}+b_{12})$:$(b_{21}+b_{22}+b_3)$ of 0.8. The widths $b_{11}$ and $b_{12}$ of the male end segment 16 then relate to the longitudinal segments 18.1 and 18.2 thereof, which were created due to the displacement of the recess 38 beyond the first base 22 in the length direction of the fastening means.

Figure 7:
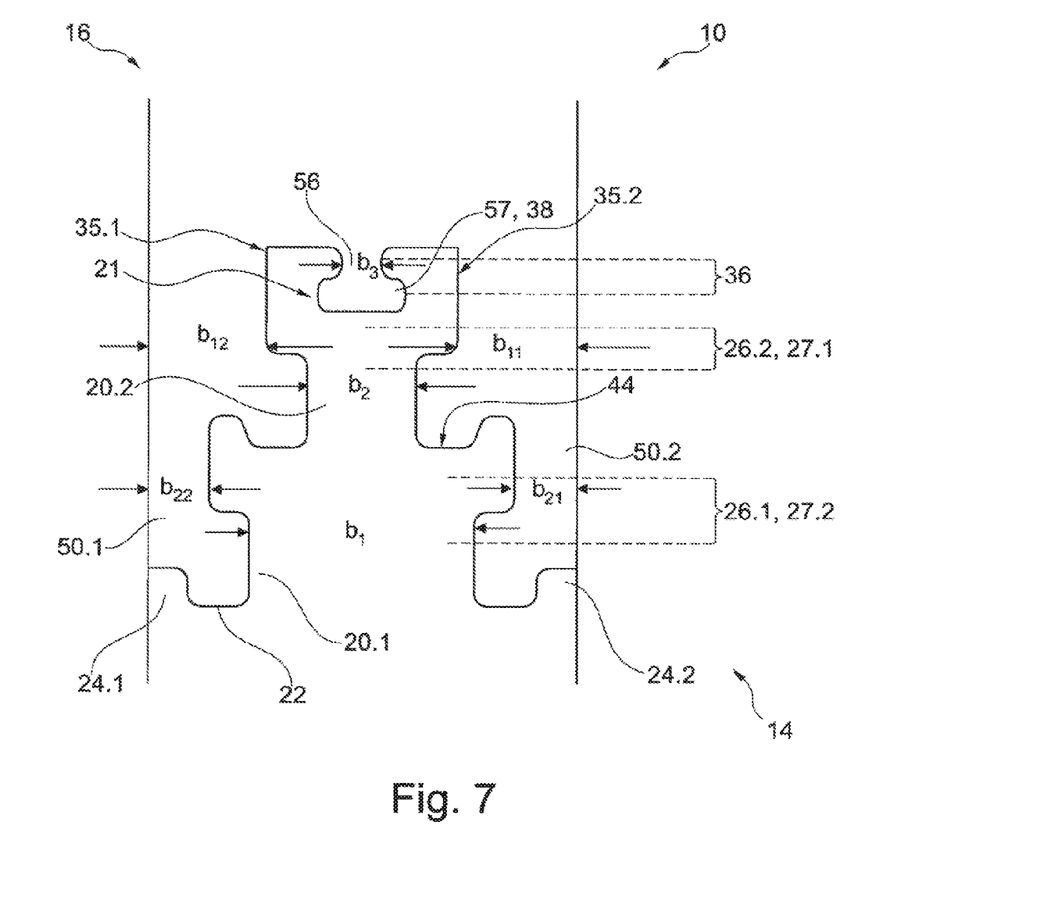
FIG. 7 is a fourth example of the fastening means.

Finally, FIG. 7 depicts a fourth example of the fastening means 10 in the closed, ring-shaped condition. In this example, a first and a second outer undercut region 26.1 and 26.2 are provided in the male end segment 14 and a first and a second outer undercut region 27.1 and 27.2 of the female end segment 16 are provided. The male end segment 14 may therefore be considered to be shaped like a tree. The minimum width $b_2$ of a second male foot segment 20.2 in the second undercut region 26.2 is therefore used to determine the ratio for the second stage: $b_2$:$(b_{21}+b_{22})$, $b_{21}$ and $b_{22}$ being minimum widths of longitudinal segments 50.1 and 50.2 of the female end segment 16 in the latter's second outer undercut region 27.2, so that the ratio is approximately 0.8, while for determining the cross-sectional width ratio, a minimum width $b_1$ of the male foot segment 20.1 in the latter's first undercut region 26.1 and widths $b_{11}$ and $b_{12}$ of the outer lateral longitudinal segments 50.1 and 50.2 of the female end segment in the latter's first undercut region 27.1 and also a minimum width $b_3$ of the inner undercut region 36 are used on the first stage, and the ratio there $b_1$:$(b_{11}+b_{12}+b_3)$ is approximately 0.8. Because two outer undercut regions 26.1 and 26.2/27.1 and 27.2 are provided, the fourth example according to FIG. 7 has excellent values for static tensile elongation. Following the first undercut region 26.1, then, a longitudinal undercut region is again provided due to the trough-like formation 44, as is provided by the projections 24.1 and 24.2 in the first example according to FIG. 2a, for instance. In addition, however, corresponding projections 24.1 and 24.2 are also provided on the base 22. Otherwise the upper part with the recess 38 is embodied identical to the second example according to FIGS. 4 and 6. If there was a desire to provide two inner undercut regions, in a tree-like manner a recess 38 would be provided in the adjacent segment or a foot 20.1 would also be provided.

With the fastening means, a fastening means is provided that supplies better values in terms of tensile and bending load, so that ultimately crack openings are prevented during operation and the service life of the fastening means is thereby significantly extended.

The invention claimed is:

1. A fastening means, comprising:
   a male end segment and a female end segment complementary to the male end segment,
   wherein the female end segment comprises a base on which there is arranged approximately centrally a foot segment and two outer segments,
   a head part being arranged on the foot segment, and
   the two outer segments project beyond the head part in a longitudinal direction of the fastening means, the longitudinal direction being approximately perpendicular to the base,
   the head part projecting laterally over an outer contour of the foot segment and having lower lateral surfaces transverse to a longitudinal direction of the fastening means for fitting at least one inner undercut region in a recess of the male end segment.

2. The fastening means according to claim 1, wherein the foot segment proceeds from the base tapering to a minimum width $b_3$.

3. The fastening means according to claim 1, wherein a transition angle β between the base and the foot segment is in a range from 91° to approximately 110°.

4. The fastening means according to claim 1, wherein arranged between lateral longitudinal surfaces of the foot segment and the lower lateral surfaces of the head part are radial regions having notch radii of at least approximately 0.3 millimeters.

5. The fastening means according to claim 1, wherein at least parts of the lateral surfaces of the head part are curved with notch radii of at least approximately 0.3 millimeters.

6. The fastening means according to claim 1, further comprising a lateral head surface of the head part in at least one sub-region approximately parallel to the base.

7. The fastening means according to claim 1, wherein the outer segments have recesses in which extension parts of the male end segment may be arranged.

8. The fastening means according to claim 1, wherein, in addition to the inner undercut region, the male end segment includes at least one outer undercut region.

9. The fastening means according to claim 1, wherein the male end segment has a second foot segment that proceeds from a base tapering to a minimum width $b_1$.

10. The fastening means according to claim 9, wherein a transition angle γ between the base and the second foot segment of the male end segment is in a range from approximately 90.5° to approximately 110°.

11. The fastening means according to claim 9, wherein, arranged on the male segment at an end of the second foot segment that faces away from the base, is a second head part with extension parts that form the inner undercut region.

12. The fastening means according to claim 11, wherein the extension parts comprise lateral transverse surfaces to form at least one outer undercut region.

13. The fastening means according to claim 12, further comprising at least one of:
   an acute angle W, formed by the lateral transverse surfaces, with lateral longitudinal surfaces of the foot segment, in a range from approximately 45° to approximately 88° ; and
   notch radii of at least 0.3 millimeters arranged in a region between the lateral longitudinal surfaces of the foot segment and lateral transverse surfaces of the extension parts.

14. The fastening means according to claim 11, wherein longitudinal surfaces of the extension parts are approximately parallel to the outer wall of the fastening means.

15. The fastening means according to claim 11, wherein between the extension parts of the second head part of the male segment is a recess that is complementary to the head part of the foot segment arranged on the base of the female end segment.

16. The fastening means according to claim 1, wherein a length of the second foot segment and of the second head part including the extension parts is shorter than a width of the fastening means.

17. The fastening means according to claim 1, wherein minimum widths $b_{21}$ and $b_{22}$ of both of the two outer segments of the female end segments of the female end segment, and a minimum width $b_3$ of the foot segment of the female end segment, are all selected based on one of the following:
   (a) for a minimum width $b_1$ of a second foot segment of the male end segment a ratio $b_1:(b_{21}+b_{22}+b_3)$ is approximately 0.79 to approximately 1.27; or
   (b) there is a recess that is arranged so as to be displaced beyond a base of the male end segment in a length direction of the fastening means, and longitudinal segments in a region of the recess have minimum widths $b_{11}$ and $b_{12}$, so that a ratio of $(b_{11}+b_{12}):(b_{21}+b_{22}+b_3)$ is approximately 0.79 to approximately 1.27.

18. The fastening means according to claim 1, wherein the fastening means is at least one of ribbon-like and closable to create a ring in which the male and the female end segments are connected to one another.

19. A system, comprising a bellows and a fastening means, the fastening means comprising:
   a male end segment and a female end segment complementary to the male end segment,
   wherein the female end segment comprises a base on which there is arranged approximately centrally a foot segment and two outer segments,
   a head part being arranged on the foot segment, and
   the two outer segments project beyond the head part in a longitudinal direction of the fastening means, the longitudinal direction being approximately perpendicular to the base,
   the head part projecting laterally over an outer contour of the foot segment and having lower lateral surfaces transverse to a longitudinal direction of the fastening means for fitting at least one inner undercut region in a recess of the male end segment.

* * * * *